United States Patent
Oldenbeuving et al.

(10) Patent No.: US 10,338,318 B2
(45) Date of Patent: Jul. 2, 2019

(54) PLANAR LIGHTWAVE CIRCUITS (PLCS) EXHIBITING CONTROLLABLE TRANSMISSIVITY / REFLECTIVITY

(71) Applicant: OctroliX BV, Enschede (NL)

(72) Inventors: Ruud Oldenbeuving, Enschede (NL); Chris Roeloffzen, Weerselo (NL); Roelof Timens, Hengelo (NL); Ilka Dove, Schuttorf (NL)

(73) Assignee: LioniX International BV, Enschede (NL)

( * ) Notice: Subject to any disclaimer, the term of this patent is extended or adjusted under 35 U.S.C. 154(b) by 0 days.

(21) Appl. No.: 15/332,745

(22) Filed: Oct. 24, 2016

(65) Prior Publication Data

US 2017/0115454 A1 Apr. 27, 2017

Related U.S. Application Data

(60) Provisional application No. 62/245,798, filed on Oct. 23, 2015.

(51) Int. Cl.
*G02B 6/293* (2006.01)
*G02F 1/313* (2006.01)

(52) U.S. Cl.
CPC ..... *G02B 6/29343* (2013.01); *G02B 6/29352* (2013.01); *G02B 6/29395* (2013.01); *G02F 1/3132* (2013.01); *G02F 2203/055* (2013.01); *G02F 2203/15* (2013.01)

(58) Field of Classification Search
CPC ............ G02B 6/29343; G02B 6/29352; G02B 6/29395; G02F 1/3132
See application file for complete search history.

(56) References Cited

U.S. PATENT DOCUMENTS

| | | | | |
|---|---|---|---|---|
| 6,289,151 B1* | 9/2001 | Kazarinov | ............. | B82Y 20/00 385/24 |
| 6,522,812 B1* | 2/2003 | Nikonov | ............ | G02B 6/12004 385/37 |
| 7,565,045 B2 | 7/2009 | Suzuki | | |
| 9,812,845 B1* | 11/2017 | Lee | ........................ | H01S 5/5027 |
| 2004/0156580 A1* | 8/2004 | Baumann | ........... | G02B 6/12007 385/16 |
| 2009/0208209 A1* | 8/2009 | Ng | ..................... | G02B 6/12007 398/49 |

(Continued)

FOREIGN PATENT DOCUMENTS

WO 20110108617 A1 9/2011

OTHER PUBLICATIONS

Gao et al., "Analysis of Optical Reflector Based on Circular Coupled Microring Resonators", IEEE Publication, ICTON 2009, pp. 1-4.

(Continued)

*Primary Examiner* — Thomas A Hollweg
*Assistant Examiner* — Mary A El-Shammaa
(74) *Attorney, Agent, or Firm* — Kaplan Breyer Schwarz, LLP

(57) ABSTRACT

Aspects of the present disclosure describe planar lightwave circuit systems, methods and structures including a resonant mirror assembly having cascaded resonators that provide or otherwise facilitate the control of the transmissivity/reflectivity of a planar lightwave circuit (PLC)—or portion thereof—over a range of 0% to substantially 100%.

20 Claims, 6 Drawing Sheets

(56) References Cited

U.S. PATENT DOCUMENTS

| | | | |
|---|---|---|---|
| 2010/0067843 A1 | 3/2010 | Little | |
| 2010/0183312 A1* | 7/2010 | Bolla | G02B 6/12007 398/85 |
| 2010/0196014 A1* | 8/2010 | Bolla | G02B 6/12007 398/141 |
| 2010/0209038 A1 | 8/2010 | Popovic et al. | |
| 2011/0116802 A1* | 5/2011 | Kamei | G02B 6/12019 398/87 |
| 2015/0109661 A1 | 4/2015 | Li et al. | |

OTHER PUBLICATIONS

Chen et al., "Compact bandwidth-tunable microring resonators", Optics Letters, vol. 32, No. 22, Nov. 15, 2007, pp. 3361-3364.

Officer: Jazqueline Van Ekelenburg, "Invitation to Pay Additional Fees, and Where Applicable, Protest Fees", International Patent Application No. PCT/IB2016/001898, dated Apr. 6, 2017, 7 pp.

Otto Schwelb, Microring Resonator Based Photonic Circuits: Analysis and Design, Telsiks 2007, Serbia, Nis, Sep. 26-28, 2007, pp. 187-194.

"International Search Report and the Written Opinion", International Patent Application PCT/IB2016/001898, Completed Jun. 7, 2017, 19 pp.

Wesley D. Sacher et al., "Binary phase-shift keying by coupling modulation of microring", Aug. 13 2014, 8 pp., vol. 22, No. 17, Publisher: Optics Express.

Gao et al., On-Chip Reflectivity-Tunable Single Wavelength Reflector, IEEE Photonics Technology Letters, Sep. 15, 2015, pp. 1938-1941, vol. 27, No. 18.

Little et al., Tunable Bandwidth Microring Resonator Filters, ECOC 2008, Sep. 21-25, 2 pp., 2008, vol. 4, Published: Brussels Belgium.

* cited by examiner

PLANAR LIGHTWAVE CIRCUITS (PLCS) EXHIBITING CONTROLLABLE TRANSMISSIVITY / REFLECTIVITY

CROSS REFERENCE TO RELATED APPLICATION

This application claims the benefit of U.S. Provisional Patent Application Ser. No. 62/245,798 filed Oct. 23, 2015 which is incorporated by reference as if set forth at length herein.

TECHNICAL FIELD

This disclosure relates generally to photonic integrated circuit (PIC) technologies and more particularly to planar lightwave circuits (PLCs) exhibiting controllable transmissivity/reflectivity.

BACKGROUND

As is known, PLCs have found widespread applicability in a number of technological arts including communications and biomedical instrumentation—among others. In a number of such applications, controlling light that propagates through the PLC (i.e., transmissivity/reflectivity of the PLC) is of critical importance. Given this importance, systems, methods structures that provide or otherwise facilitate control of the transmissivity/reflectivity of a PLC would represent a welcome addition to the art.

SUMMARY

An advance in the art is made according to aspects of the present disclosure which describes systems, methods and structures that include a resonant mirror assembly having a number of cascaded resonators that provide or otherwise facilitate the control of the transmissivity/reflectivity of a planar lightwave circuit (PLC)—or portion thereof—over a range of 0% to substantially 100%.

Viewed from a first aspect, the present disclosure describes a planar lightwave circuit comprising an input port; an output port; and a resonant mirror assembly optically coupling the input port to the output port, the resonant mirror assembly including a number of cascaded optical resonators, each optical resonator exhibiting a pair of coupling coefficients, wherein one of the coupling coefficients of at least one of the plurality of resonators is different in value from all the other coupling coefficients. Of particular advantage, such difference may be achieved at the time of fabrication and/or during operation of the PLC.

Viewed from another generalized aspect the present disclosure is directed to a planar lightwave circuit comprising an input waveguide; an output waveguide; n optical resonators where n>=3; n+1 bus waveguides, each of bus waveguides having a first end and a second end; a first coupler optically coupling the input waveguide to the first end of the first one of the n bus waveguides and to the first end of the nth of the n bus waveguides; a second coupler optically coupling the output waveguide to the second end of the first one of the n bus waveguides and to the second end of another one of the n bus waveguides; wherein each of the n optical resonators are optically coupled to at least two of the bus waveguides, each of the resonator bus couplings being defined by a coefficient K; and wherein at least one of the coefficients is different in value from all of the others.

BRIEF DESCRIPTION OF THE DRAWING

A more complete understanding of the present disclosure may be realized by reference to the accompanying drawing in which.

Figure 1:
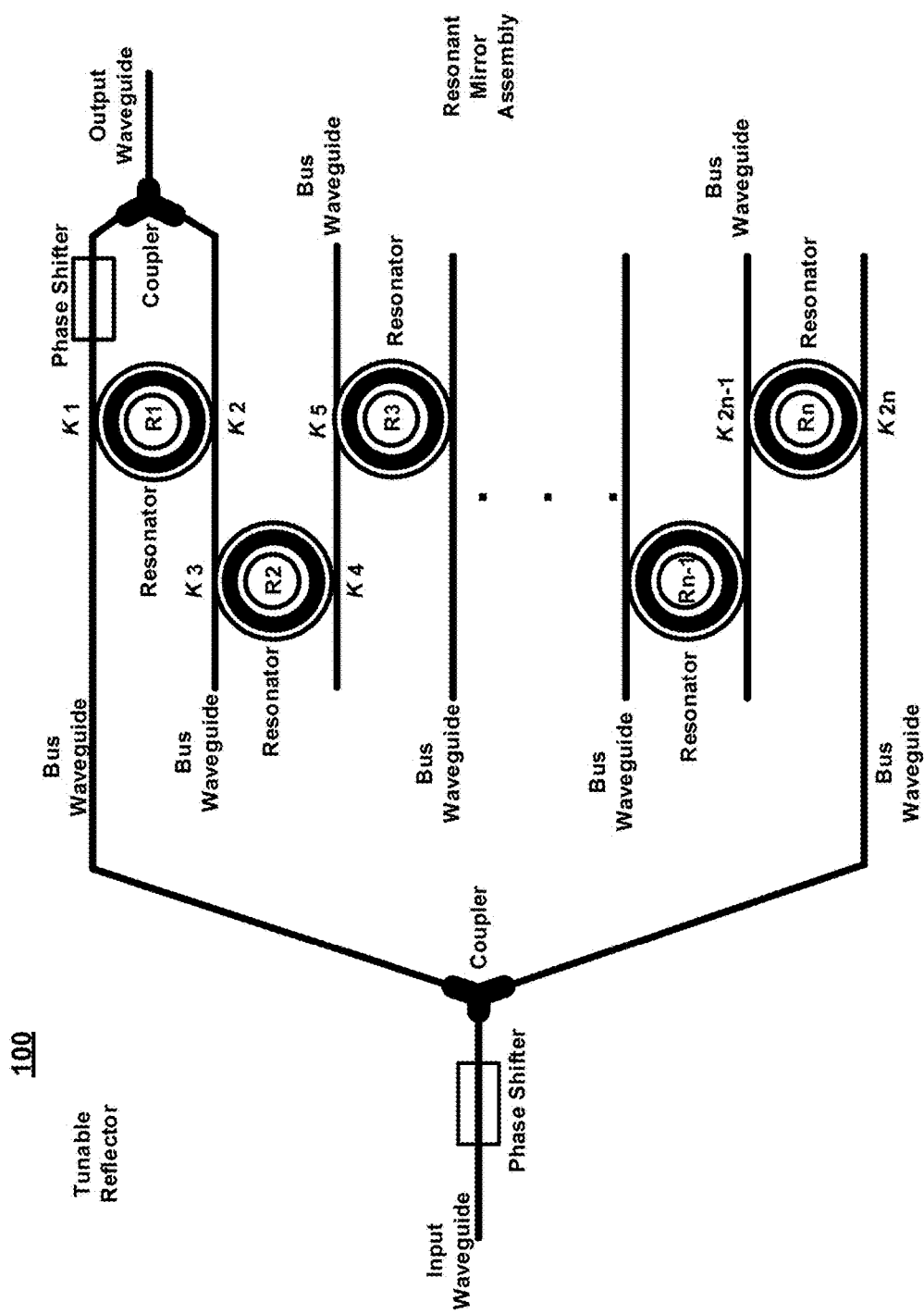
FIG. 1 depicts a schematic diagram of an illustrative, generalized PLC tunable reflector including n cascaded tunable resonators according to an aspect of the present disclosure.

The illustrative embodiments are described more fully by the Figures and detailed description. Inventions according to this disclosure may, however, be embodied in various forms and are not limited to specific or illustrative embodiments described in the Figures and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

Turning now to FIG. 1, there is shown a schematic diagram depicting a generalized, PLC tunable reflector including cascaded tunable resonators according to an aspect of the present disclosure. As may be observed from that FIG. 1, the tunable reflector includes an input waveguide and an output waveguide optically coupled—through the effect of a pair of couplers—to a series of bus waveguides which in turn are coupled to one or more resonator structures. As may be appreciated by those skilled in the art, this "cascaded resonator structure" including bus waveguides and coupled resonators operatively form a resonant mirror assembly which advantageously permits the selective control of the transmissivity/reflectivity of the overall tunable reflector structure with regard to light traversing the tunable reflector structure.

Of particular significance to those skilled in the art is that the structure(s) shown in FIG. 1 may advantageously be fabricated from any of a variety of known materials, techniques and/or processes. Note that while the resonators shown in the Figure(s) are schematically shown as ring resonators, those skilled in the art will readily appreciate that any of a variety of known structures providing resonator functionality including ring, racetrack, solid disk, bragg grating, Mach-Zehnder, etc. may be employed—including different individual (mixed) ones in a particular reflector structure. Similarly, while the couplers are shown in the Figure(s) as "Y" couplers, this disclosure is not so limited and therefore alternative coupler structures may likewise be advantageously employed. Additionally, particular waveguide structures may likewise be any of a variety known in the art as suitable for PLC applications including—but not limited to—TRIPLEX waveguides described in U.S. Pat. Nos. 7,146,087 and 7,142,759, each of which is incorporated by reference as if set forth at length herein. Finally—and as we shall discuss in more detail later—we note that controllability of the overall transmissivity/reflectivity of structures according to the present disclosure and as generally shown in FIG. 1 may advantageously be achieved through the effect of techniques and/or structures that affect the resonant structures characteristics including heat, stress, etc. More specifically, phase shifters shown in the Figure(s) may be constructed from any of a variety of known structures/techniques/materials that are compatible with the particular structure(s) employed and produce the desired amount of heat, stress, etc., that affects characteristics in a desired manner. Note further that the phase shifters shown as part of input waveguides or bus waveguides are optionally added to the structures disclosed herein as desired and/or necessary to achieve desired functionality.

Figure 2:
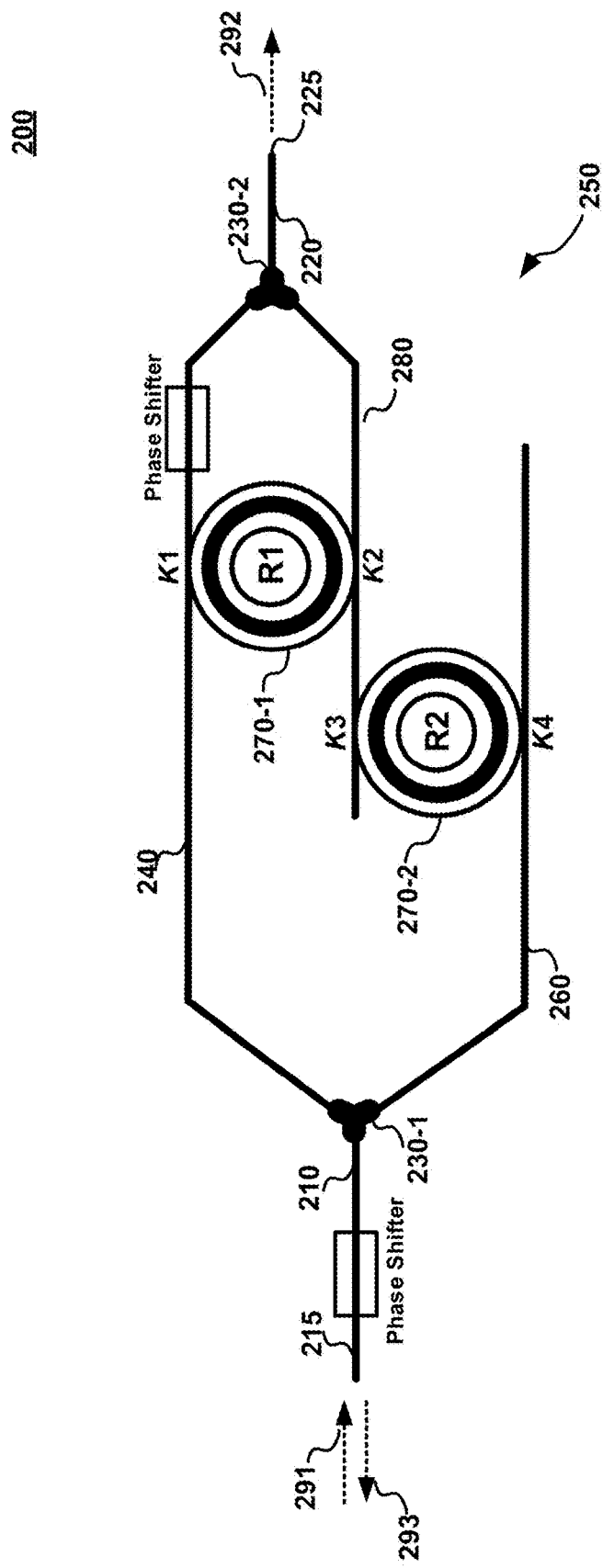
FIG. 2 depicts a schematic diagram of an illustrative PLC tunable reflector including two cascaded tunable resonators according to an aspect of the present disclosure.

Turning now to FIG. 2, there is shown a schematic diagram depicting an illustrative PLC tunable reflector including two cascaded tunable resonators according to an aspect of the present disclosure. As may be observed from FIG. 2, tunable reflector 200 includes input port 215, output port 225, input waveguide 210, output waveguide 220 and resonant mirror assembly 250. Input waveguide 210 and output waveguide 210 are optically coupled to resonant mirror assembly 250 by couplers 230-1 and 230-2, respectively. Individual phase shifters are shown with respect to the input waveguide 210 and bus waveguide 240.

As may be readily understood from FIG. 2, input waveguide 210 receives input light 291 at input port 215 and provides reflected light 293 to that same port. Output waveguide 220 provides output light 292 at output port 225.

Operationally—and as will be appreciated by those skilled in the art—tunable reflector 200 receives input light 291 and controls the wavelength(s) of reflected light signal(s) 293, as well as distribution of light in transmitted light signal 292 and reflected light signal 293.

Resonant mirror structure 250 exhibits a controllable reflectivity and is operatively coupled between input waveguide 210 and output waveguide 220. Resonant mirror structure 250 is shown including a number of ring resonators namely, R1, and R2 and bus waveguides 240, 260 and 280. As generally depicted in FIG. 2—and as will be readily understood by those skilled in the art—a ring resonator (optical ring resonator) is a set of waveguides in which at least one is a closed loop coupled to some light input and output which may be—but are not limited to being—waveguides. Notably, while the ring resonators R1 and R2 are shown as "single ring" structures, those skilled in the art will appreciate that the specific structures of individual resonators may differ from those shown, i.e., "double" or "multi-ring" resonator structures, or resonator structures exhibiting different radii from those depicted in the figure or one another. Additionally—and as previously noted generally with respect to FIG. 1—specific configurations may include a different number of resonator structures and different number of bus waveguides and other structures (including any optional phase shifter(s) in the bus or input or other waveguides) which are included in a particular, overall resonant mirror structure.

Operationally, resonant mirror structure 250 reflects wavelengths in input light 291 back to input port 215 as a function of collective resonance(s) of ring resonators R1 and R2 that are included in resonant mirror structure 250. As will be understood by those skilled in the art, resonant mirror structure 250 is analogous to ring resonator-based mirrors described in U.S. Pat. No. 7,835,417 which is incorporated herein by reference as if set forth at length however, resonant mirror structure 250 exhibits additional functionality in that it is operable for controlling the amount of optical power reflected to input port 215 and conveyed to output port 225. Notably, and as will be further understood by those skilled in the art, resonant mirror structure 250 reflects a plurality of wavelength components which are separated by the free-spectral range (FSR) of the composite resonant structure. Advantageously, the wavelengths reflected may be tuned anywhere within the spectral range represented by this FSR.

As previously noted, input waveguide 210 and output waveguide 220 are optically coupled to resonant mirror assembly 250 by couplers 230-1 and 230-2. As depicted in FIG. 2, couplers 220-1 and 220-2 are a known type of coupler namely, "Y" couplers as they are known in the art and may be advantageously fabricated using conventional, integrated optics techniques and methods. As shown in FIG. 2, coupler 230-1 optically couples input waveguide 210 equally (50:50) with bus waveguides 240 and 260. As a result, input light 291 is split substantially equally into the two bus waveguides 240 and 260. Additionally—and while not specifically shown in FIG. 2—it is noted and understood that in certain implementations it may be desirable to optically couple input waveguide 210 to bus waveguides 240 and 260 using other structures such as a directional coupler.

Similarly, coupler 230-2 may be a conventional integrated-optics Y-coupler that optically couples bus waveguides 240 and 280 to output waveguide 220 such that light traversing the bus waveguides is combined to form output light 292. Again, it is noted that in certain implementations it may be desirable to optically couple output waveguide 220 to bus waveguides 240 and 280 using other structures such as a directional coupler.

Each of the ring resonators R1 and R2 may advantageously be formed as an integrated-optics waveguide ring that is optically coupled to a pair of bus waveguides. The individual resonance(s) of resonators R1 and R2 may be advantageously controlled individually by respective phase shifters 270-1 and 270-2. Note further that while phase shifters 270-1, and 270-2 are depicted in FIG. 2 as extending completely over respective resonator(s), phase shifters employed in a particular configuration may or may not so extend.

Notably, while this illustrative embodiment shown in FIG. 2 employs ring resonators that—in conjunction with waveguides and couplers—collectively define resonant mirror structure 250, those skilled in the art will readily understand and appreciate that alternative resonant structures may be employed including—but not limited to—cascaded resonant structure(s) having at least one alternative tunable resonant element for example, a tunable optically resonant cavity, a tunable coupled-cavity filter, and the like.

We additionally note that while coefficient K may be defined over a range of $0 \le K \le 1$, structures according to the present disclosure will preferably exhibit a range of $0.05 \le K \le 1$. With structures exhibiting two individual resonator structures and characterized by coefficients K1, K2, K3, and K4 such as that shown in FIG. 2, it is generally preferable to configure it such that at least three of the coefficients (i.e., K2, K3, and K4) are substantially equal to one another while the fourth (i.e., K1) is different (greater or lesser) than the other three (i.e. K2=K3=K4 and K1≠K2; K1≠K3; and K1≠K4; or K1=K3=K4 and K2≠K1; K2≠K3; and K2≠K4) By choosing an appropriate combination of coupling coefficients K1 through K4, the overall reflectance and transmittance of resonant mirror structure 250 may be selectively controlled. As noted previously—according to the present disclosure—at least one of the coefficients is different in value from the others which are all the same value.

Figure 3:
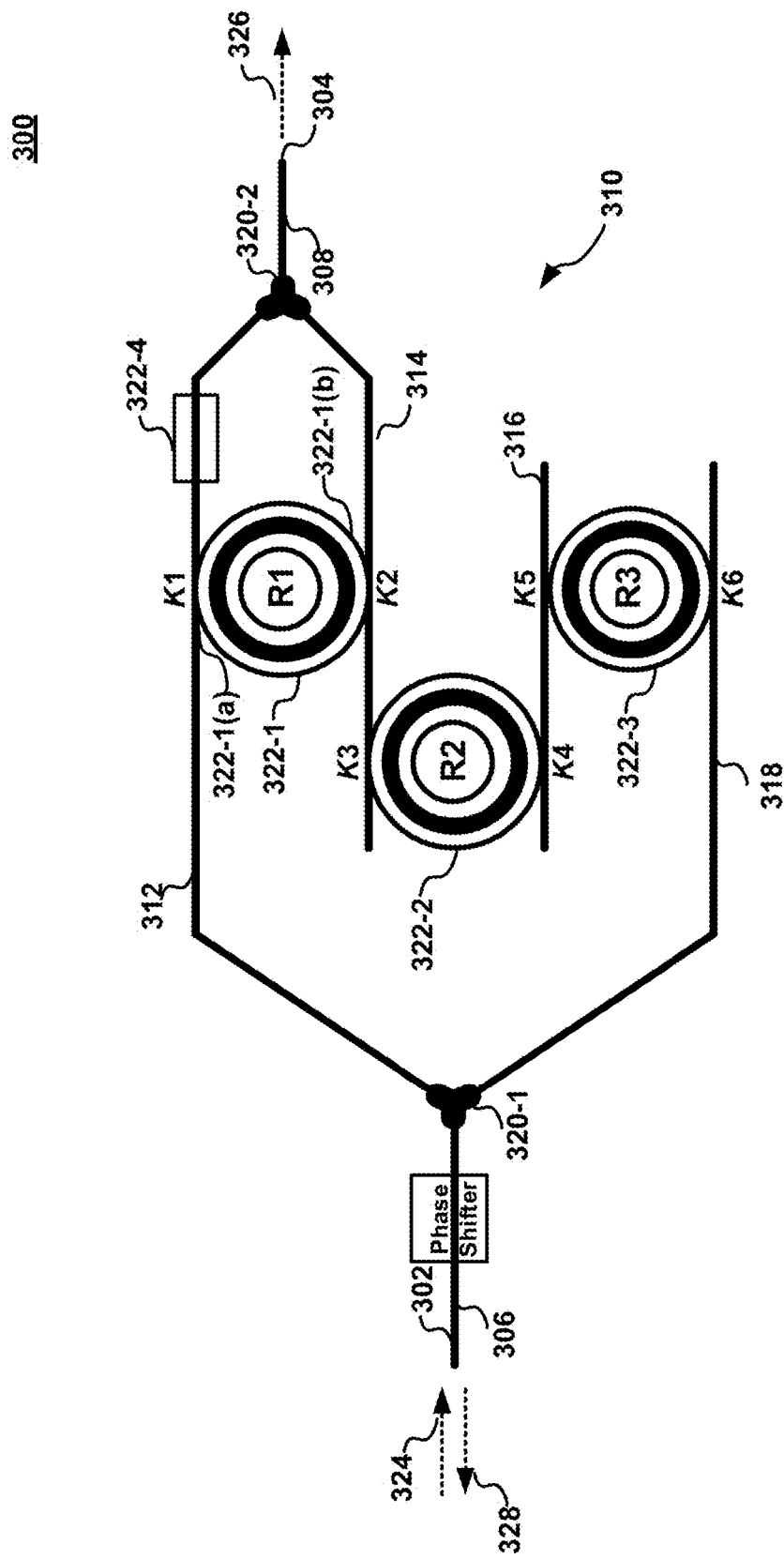
FIG. 3 depicts a schematic diagram of another alternative illustrative PLC tunable reflector including three cascaded tunable resonators according to an aspect of the present disclosure.

Turning now to FIG. 3, there is shown a schematic diagram depicting an illustrative PLC tunable reflector including cascaded three tunable resonators according to an aspect of the present disclosure. As may be observed from FIG. 3, tunable reflector 300 includes input port 302, output port 304, input waveguide 306, output waveguide 308 and resonant mirror assembly 310. Input waveguide 306 and output waveguide 308 are optically coupled to resonant mirror assembly 310 by couplers 320-1 and 320-2, respectively.

As may be readily understood from FIG. 3 and similar to that previously described—input waveguide 306 receives input light 324 at input port 302 and provides reflected light 328 to that same port. Output waveguide 308 provides output light 326 at output port 304.

Operationally—and as will be appreciated by those skilled in the art—tunable reflector 300 receives input light 324 and controls the wavelength(s) of reflected light signal(s) 328, as well as distribution of light in transmitted light signal 326 and reflected light signal 328.

Advantageously, waveguides employed in tunable reflector 300 may be any of a variety of known integrated optical waveguides suitable for use in PLC structures. Of further advantage, waveguides employed in tunable reflector(s) according to the present disclosure such as that shown in FIG. 3, as may include multi-core waveguides.

Resonant mirror structure 310 exhibits a controllable reflectivity and is operatively coupled between input waveguide 306 and output waveguide 308. Resonant mirror structure 310 is shown as a coupled-cavity resonator that includes a number of ring resonators namely, R1, R2, and R3 and bus waveguides 312, 314, 316, and 318. As generally depicted in FIG. 3—and as will be readily understood by those skilled in the art—a ring resonator (optical ring resonator) is a set of waveguides in which at least one is a closed loop coupled to some light input and output which may be—but are not limited to being—waveguides. Notably, while the ring resonators R1, R2, and R3 are shown as "single ring" structures, those skilled in the art will appreciate that the specific structures of individual resonators may differ from those shown, i.e., "double" or "multi-ring" resonator structures, or resonator structures exhibiting different radii from those depicted in the figure or one another.

Operationally, resonant mirror structure 310 reflects wavelengths in input signal 324 back to input port 302 as a function of collective resonance of ring resonators R1, R2, and R3 that are included in resonant mirror structure 310. As will be understood by those skilled in the art, resonant mirror structure 310 is analogous to ring resonator-based mirrors while exhibiting additional functionality in that it is operable for controlling the amount of optical power reflected back to input port 302 and transmitted to output port 304. Resonant mirror structure 310 reflects a plurality of wavelength components which are separated by the free-spectral range (FSR) of the composite resonant structure and may advantageously be tuned anywhere within the spectral range represented by the FSR.

As previously noted, input waveguide 306 and output waveguide 308 are optically coupled to resonant mirror assembly 310 by couplers 320-1 and 320-2 that are illustratively depicted as Y-couplers that may be advantageously fabricated using conventional, integrated optics techniques and methods. As shown in that Figure, coupler 320-1 optically couples input waveguide 306 equally (50:50) with bus waveguides 312 and 318. As a result, input light 324 is split substantially equally into the two bus waveguides 312 and 318. Additionally—and while not specifically shown in FIG. 3—it is noted that in certain implementations it may be desirable to optically couple input waveguide 306 to bus waveguides 312 and 318 using other structures such as a directional coupler or other couplers exhibiting different splitting ratios. When such directional coupler(s) are used as replacement for one or both couplers 320-1, 320-2 improved transmittance through overall reflector structure may advantageously be achieved.

Similarly, coupler 320-2 may be a conventional integrated-optics y-coupler that optically couples bus waveguides 312 and 314 to output waveguide 308 such that light traversing the bus waveguides is combined to form output light 326. Again, it is noted that in certain implementations it may be desirable to optically couple output waveguide 308 to bus waveguides 312 and 314 using other structures such as a directional coupler.

Each of the ring resonators R1, R2, and R3 may advantageously be formed as an integrated-optics waveguide ring that is optically coupled to a pair of bus waveguides. The individual resonance(s) of resonators R1, R2, and R3 may be controlled respectively by phase shifters 322-1, 322-2, and 322-3. Note further that while phase shifters 322-1, 322-2, and 322-3 are depicted in FIG. 3 as extending completely over respective resonator(s), phase shifters employed in a particular configuration may or may not so extend.

By way of illustrative example only, phase shifters employed may extend over only a portion of respective ring resonator(s) and advantageously enable separate control of coupling coefficients for a ring and its associated bus waveguides. As a further illustrative example, ring resonator R1—shown operatively coupled with phase shifter 322-1 in FIG. 3—may include independent portions such that independent control of coupling coefficients K1 (shown between ring R1 and bus waveguide 312 in FIGS. 1) and K2 (shown between ring R1 and bus waveguide 314 in FIG. 3) may be controlled by—for example—phase shifter portion 322-1(a) and 322-1(b), respectively. Similar independently controllable structures may be employed in any or all of the individual resonators as desired.

Notably, while this illustrative embodiment shown in FIG. 3 employs ring resonators that—in conjunction with waveguides and couplers—collectively define resonant mirror structure 310, those skilled in the art will readily understand and appreciate that alternative resonant structures may be employed including—but not limited to—cascaded resonant structure(s) having at least one alternative tunable resonant element for example, a tunable optically resonant cavity, a tunable coupled-cavity filter, and the like may be employed as well.

With this illustrative, overall structure described, those skilled the art will understand that each of the ring resonators R1, R2, and R3 is characterized by a quality factor (i.e., "Q" factor) that may advantageously be controlled or otherwise influenced by its respective heater(s) or portions. By choosing an appropriate combination of coupling coefficients K1 through K6, the overall reflectance and transmittance of resonant mirror structure 310 may be selectively controlled.

Continuing with our discussion of FIG. 3, it may be observed that phase shifter 322-4 is operatively coupled to bus waveguide 312 such that it may operate as a phase shifter for light traversing the bus waveguide resulting in a positive coherent superposition of the light in the bus waveguide. In alternative embodiment(s), phase shifter 322-4 may be operatively coupled to bus waveguide 314 or—in a further alternative embodiment—a similar phase shifter(s) may be operatively coupled to both waveguides 312, 314 and/or other waveguide(s) as desired and/or necessary such that independent control of the phase of light in individual waveguides is enabled. In still further illustrative embodiments, a different phase shifter/controller may be used to control the phase of light in one or more of the bus waveguides, such as stress-tuning elements described in U.S. patent application Ser. No. 14/580,831, filed Dec. 23, 2015, the entire contents of which is incorporated by reference as if set forth at length herein.

Figure 4:
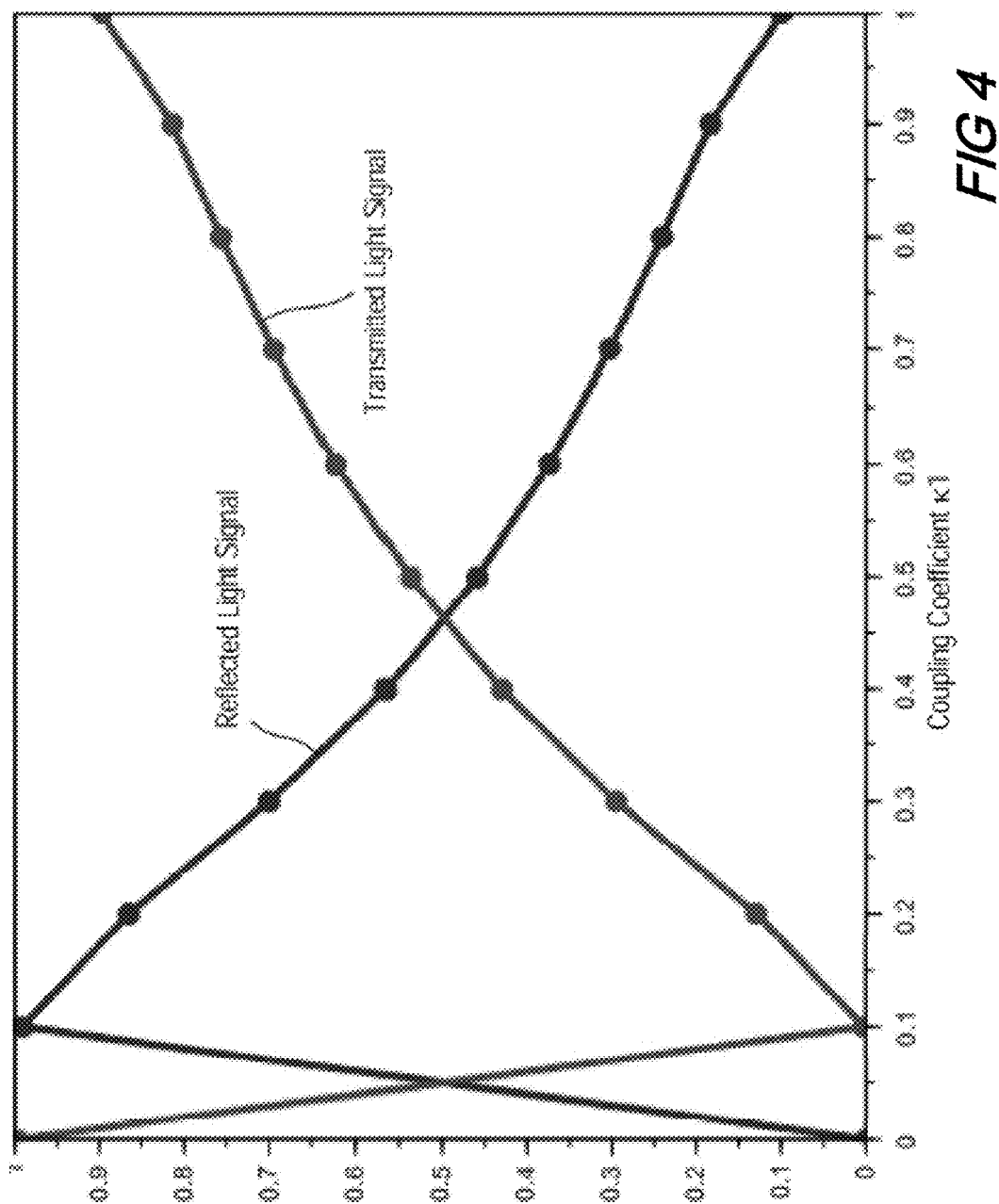
FIG. 4 depicts a plot of transmitted and reflected light as a function of coupling coefficients K1 through K6 according to an aspect of the present disclosure.

With reference now to FIG. 4, there is shown a plot of transmitted and reflected light for illustrative structures according to the present disclosure such as that depicted in FIG. 3 as a function of coupling coefficients K1 through K6. More particularly, the plot shown in FIG. 4 illustrates the effect(s) of tuning coefficient K1 from 0.0-1.0 while each of K2 through K6 is maintained at 0.1.

As should now be appreciated by those skilled in the art, structures and methods according to the present disclosure may be employed in a variety of useful system configurations. By way of illustrative example, FIG. 5 depicts an illustrative multi-port tunable reflector according to an aspect of the present disclosure.

Figure 5:
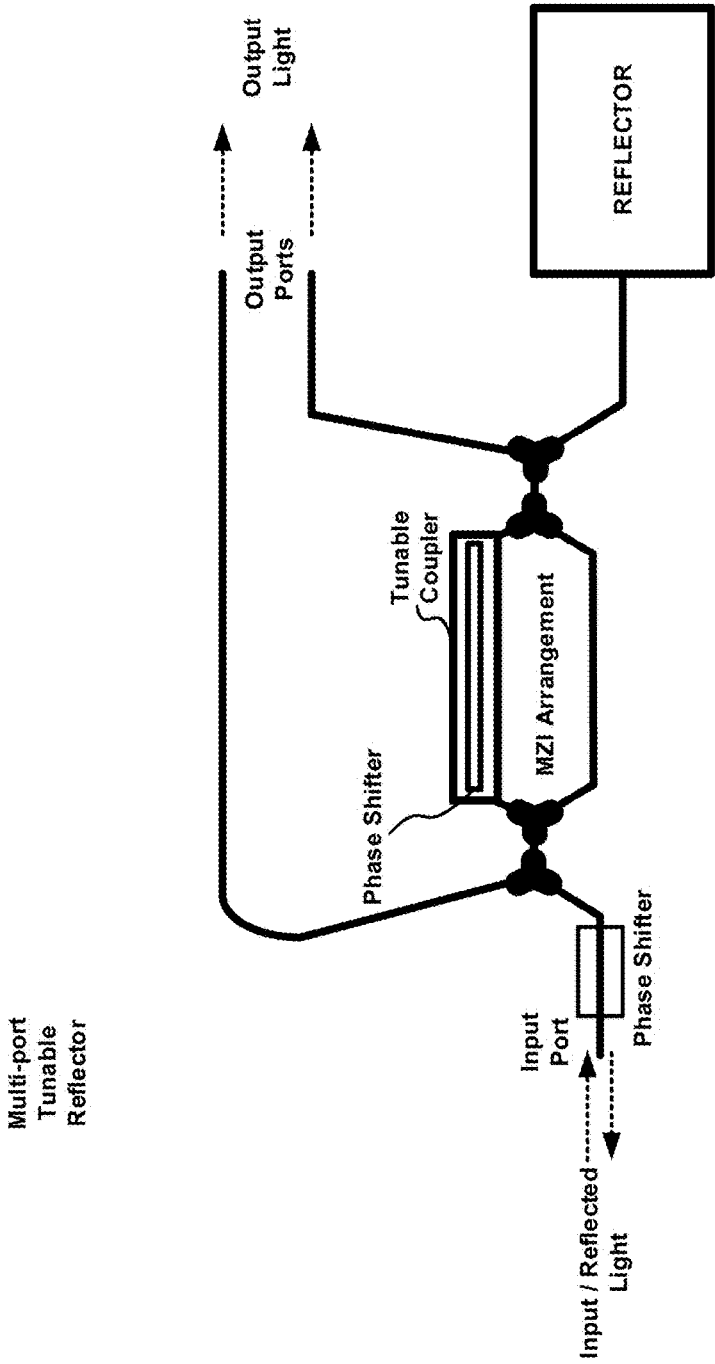
FIG. 5 depicts an illustrative multi-port tunable reflector according to an aspect of the present disclosure.

With reference now to FIG. 5, it may be observed that the multi-port tunable reflector includes a tunable reflector assembly according to the present disclosure such as that shown and described previously along with a tunable coupler configured as part of a Mach-Zehnder arrangement, an input port and a number of output ports. By including the tunable coupler between the input port and the reflector, the overall reflectivity and transmittance of the multi-port tunable reflector may be tunable from 0-100% and 100-0%, respectively. Inasmuch as the transmittance may be described by $T \in [0,1]$, the reflectivity is described by $(1-T)^2$ and the second output port will exhibit a lower output power as generally described by $(T-T)^2$, neglecting waveguide propagation loss.

Figure 6:
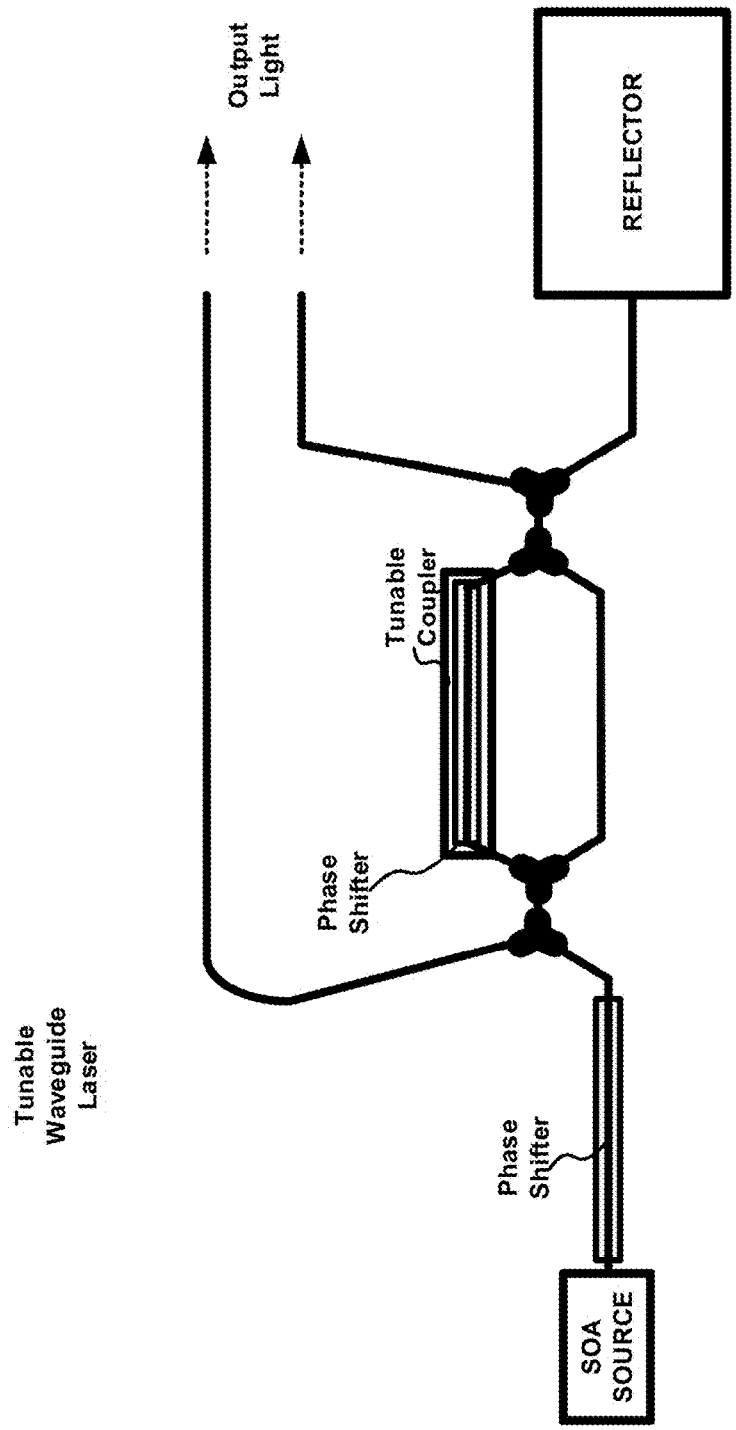
FIG. 6 depicts a schematic of an illustrative tunable waveguide laser according to an aspect of the present disclosure.

By way of yet another illustrative example, FIG. 6 depicts a schematic of an illustrative tunable waveguide laser according to an aspect of the present disclosure. Tunable waveguide laser includes a source, a tunable coupler and a tunable reflector according to the present disclosure.

Advantageously, source may include a semiconductor optical amplifier (SOA) having a gain section. In alternative configurations, source may be a different optical-gain element, for example an erbium-doped fiber amplifier, a semiconductor laser, or other, known, source elements. When configured as shown in FIG. 6, two output(s) are provided.

At this point, while we have presented this disclosure using some specific examples, those skilled in the art will recognize that our teachings are not so limited and that various alternative configurations may be readily devised by those skilled in the art. Accordingly, this disclosure should be only limited by the scope of the claims attached hereto.

What is claimed is:

1. A planar lightwave circuit comprising:
   an input port;
   an output port; and
   a resonant mirror assembly optically coupling the input port to the output port, the resonant mirror assembly exhibiting a tunable reflectivity/transmittvity, the resonant mirror assembly including a plurality of cascaded optical resonators, each optical resonator exhibiting a pair of coupling coefficients, wherein one of the coupling coefficients of at least one of the plurality of resonators is different in value from all the other coupling coefficients;
   wherein at least a portion of light received at the input port is reflected back to that port through the effect of the resonant mirror assembly.

2. The planar lightwave circuit according to claim 1 wherein all the other coupling coefficients are substantially equal in value to one another.

3. The planar lightwave circuit according to claim 1 wherein the resonant mirror assembly includes n cascaded optical resonators and n+1 bus waveguides, each of the resonators being optically coupled to a pair of bus waveguides according to its pair of coupling coefficients.

4. The planar lightwave circuit according to claim 1 wherein at last one resonator exhibits a phase that is tunable.

5. The planar lightwave circuit according to claim 1 wherein each individual resonator is one selected from the group consisting of: ring resonator, racetrack resonator, loop resonator, disk resonator, and optically resonant cavity.

6. The planar lightwave circuit according to claim 1 wherein each individual resonator is one selected from the group consisting of: ring resonator, racetrack resonator, loop resonator, disk resonator, and resonant cavity.

7. The planar lightwave circuit according to claim 1 wherein the resonant mirror assembly is coupled to the input port by a coupler selected from the group consisting of: Y-coupler and directional coupler.

8. The planar lightwave circuit according to claim 3 where n=2 and the four coupling coefficients K1, K2, K3 and K4 are configured such that three of the coupling coefficients are substantially equal in value while the fourth is greater in value than the other three.

9. The planar lightwave circuit according to claim 1 wherein both coefficients for at least one of the resonators are individually controllable.

10. The planar lightwave circuit according to claim 1 wherein the light reflected back to the input port traverses all of the resonators prior to its reflection back to the input port.

11. A planar lightwave circuit comprising:
    an input waveguide;
    an output waveguide;

a resonant mirror assembly exhibiting a controllable transmissivity/reflectivity, said resonant mirror assembly including:

n optical resonators where n>=3;

n+1 bus waveguides, each of bus waveguides having a first end and a second end;

a first coupler optically coupling the input waveguide to the first end of the first one of the n bus waveguides and to the first end of the nth of the n bus waveguides;

a second coupler optically coupling the output waveguide to the second end of the first one of the n bus waveguides and to the second end of another one of the n bus waveguides;

wherein each of the n optical resonators are optically coupled to at least two of the bus waveguides, each of the resonator bus couplings being defined by a coefficient K;

wherein at least one of the coefficients is different in value from all other coefficients;

wherein said resonant mirror assembly is configured to reflect at least a portion of light received at the input port back to that port.

12. The planar lightwave circuit of claim 11 wherein both coefficients for at least one of the resonators are individually controllable.

13. The planar lightwave circuit of claim 12 wherein both coefficients are controllable through the effect of a split heater.

14. The planar lightwave circuit of claim 11 wherein all coefficients but one are substantially equal in value to one another.

15. The planar lightwave circuit of circuit of claim 11 wherein at least one of the resonators exhibits a phase that is tunable.

16. The planar lightwave circuit according to claim 11 wherein each individual resonator is one selected from the group consisting of: ring resonator, racetrack resonator, loop resonator, disk resonator, and optically resonant cavity.

17. The planar lightwave circuit according to claim 11 wherein each individual resonator is one selected from the group consisting of: ring resonator, racetrack resonator, loop resonator, disk resonator, and resonant cavity.

18. The planar lightwave circuit according to claim 11 wherein the first coupler and the second coupler are individually selected from the group consisting of: Y-coupler and directional coupler.

19. The planar lightwave circuit according to claim 11 where n=3 and the six coupling coefficients K1, K2, K3, K4, K5, and K6 are configured such that five of the coupling coefficients are substantially equal in value while the sixth is greater in value than the other three.

20. The planar lightwave circuit according to claim 11 wherein the light reflected back to the input port traverses all of the resonators prior to its reflection back to the input port.

* * * * *